United States Patent [19]

Pool et al.

[11] 3,839,048

[45] Oct. 1, 1974

[54] COMPOSITION FOR USE IN THERMOGRAPHY

[75] Inventors: Albert Lucien Pool, Kontich; Jan Frans Van Besauw, Brasschaat, both of Belgium

[73] Assignee: AGFA-Gevaert N.V., Mortsel, Belgium

[22] Filed: July 19, 1972

[21] Appl. No.: 273,050

[30] Foreign Application Priority Data

July 20, 1971 Great Britain .................... 34045/71

[52] U.S. Cl. ............. 96/114.1, 96/48 HD, 96/50 R, 96/85, 96/114.1, 96/114.6

[51] Int. Cl. ........................... G03c 1/02, G03c 1/72

[58] Field of Search ........ 96/114.1, 114.6, 85, 27 R, 96/48 HD, 50 R

[56] References Cited

UNITED STATES PATENTS 3,457,075 7/1969 Morgan et al. ......................... 96/67

*Primary Examiner*—Ronald H. Smith
*Assistant Examiner*—Alfonso T. Suro Pico
*Attorney, Agent, or Firm*—William J. Daniel

[57] ABSTRACT

A sheet material including in working relationship with a reducible silver salt a derivative of 1,4-dihydropyridine.

A derivative of 1,4-dihydropyridine such as 2,6-dimethyl-3,5-dicarbethoxy-1,4-dihydropyridine is used as auxiliary reductor in a heat-sensitive receptor material containing a silver salt of an aliphatic carboxylic acid comprising at least 14 carbon atoms such as silver behenate.

15 Claims, No Drawings

COMPOSITION FOR USE IN THERMOGRAPHY

The present invention relates to a method for recording and reproducing information by means of heat and a material suited for use in such method.

In common thermography a heat-sensitive sheet is brought into face to face contact with a graphic original which carries an image formed of infrared-absorbing material. When the original is exposed to infrared radiation, the image portions thereof are selectively heated and cause the development in the adjacent heat-sensitive sheet of a colour pattern corresponding to the original.

In another type of recording and reproduction of information involving heat a colour-forming component of a copy sheet is rendered inactive and non-transferable by heat by exposure to short wavelength radiation. The colour-forming compound left in the unexposed or less exposed portions is transferred by heat to a receptor sheet on which it causes colour formation. This latter type of system has the advantage that the final copy is not heat-sensitive, as the reactivity of the colour-forming component has been destroyed imagewise by the short wavelength radiation. It is primarily to this type of system that the present invention is directed.

It is also possible to apply a single sheet system by using a coating containing reactive components, one of which is rendered inactive by exposure to short wavelength radiation. Known systems of this type are described by Lawton and Lopez, U.S. Pat. No. 3,076,707 and by Grant, U.S. Pat. No. 3,094,619 which utilize colour-forming systems employing diazonium compounds and alpha naphthols respectively. In these systems the copy sheet may be exposed to a short wavelength, e.g., ultraviolet radiation image of the original to be copied to inactivate at least one of the components, and then overall heated to develop colour in the areas, where the components remain reactive. Alternatively, the copy sheet may be initially exposed to infrared radiation while being in contact with the graphic original, to bring about a colour-forming reaction in the areas in contact with the black parts of the original, and subsequently exposed to short wavelength radiation to inactivate the unreacted parts of the sheet.

Two-sheet systems are exemplified by Benbrook, U.S. Pat. No. 2,789,904 and Workman, U.S. Pat. No. 3,094,417, in which a photosensitive reductor susceptible of being deactivated by exposure to short wavelength radiation is carried on a sheet separate from the sheet that carries the material with which it enters into a colour-forming reaction. In the two-sheet system, the sheet containing the deactivatable reductor is first exposed to a short wave radiation image of the original to be copied to cause deactivation of the reductor in the exposed portions. This sheet is then brought into contact with a sheet containing the other colour-forming components and heated to bring about a colour-forming reaction in the unexposed areas. This two-sheet system requires that the photosensitive reductor, when heated, will be transferred sufficiently from one sheet to the other to bring about the colour-forming reaction.

The present invention is based on the discovery that the thermal colour formation by means of photosensitive reductors applicable in the latter system and a reducible heavy metal salt such as a silver soap can be improved by the presence of an auxiliary reducing agent corresponding to the following general formula:

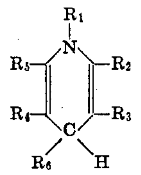

wherein:

$R_1$ represents hydrogen, or lower alkyl e.g., $C_1$–$C_5$ alkyl, $R_2$ represents hydrogen or an alkyl group e.g., a lower alkyl group such as methyl, $R_3$ represents an electronegative substituent e.g., cyano or a substituent containing a carbonyl group directly linked to the 1,4-dihydropyridine ring, e.g., is an acyl group of which an acetyl group is a preferred example, or is a carbonylalkoxy group of which carbonylmethoxy and carbonylethoxy are examples, $R_4$ represents an electronegative substituent, e.g, cyano or a substituent containing a carbonyl group directly linked to the 1,4-dihydropyridine ring e.g., is an acyl group of which an acetyl group is a preferred example or is a carbonylalkoxy group of which carbonylmethoxy andd carbonylethoxy are examples, $R_5$ represents hydrogen or an alkyl group e.g., a lower alkyl group such as methyl, and $R_6$ represents hydrogen or an organic group e.g., an alkyl group e.g., a lower ($C_1$–$C_5$) alkyl group or aryl e.g., phenyl.

Suitable representatives of derivatives falling within the scope of the above general formula are:

1. Helv. Chim. Acta *41* (1958) 2087.

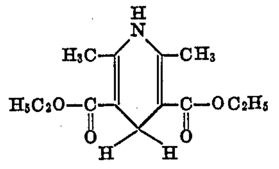

(melting point: 175–180° C.).

2. Helv. Chim. Acta *41* (1958) 2085.

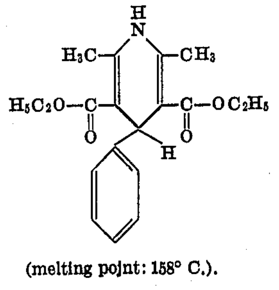

(melting point: 158° C.).

3. Ann. *670*, 57 or Czech. Chem. Comm. *31*, 2618.

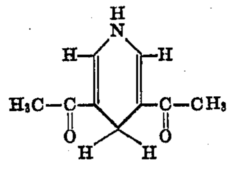

(melting point: 260° C.).

The derivatives of 1,4-dihydropyridine are believed to retain their reducing properties even after exposure to either ultraviolet radiation or actinic light.

Fairly low concentrations of the present reducing agent may be employed so that it will reduce a silver metal soap under normally employed reaction temperature only in the presence of a photosensitive reducing agent.

The silver metal images obtained by means of the present reductor used as auxiliary reducing agent have a markedly improved colour density as compared to images prepared without said reducing agent.

Suitable photosensitive reductors for silver metal soaps that are advantageously combined with the present auxiliary reducing agent(s) are those which are rendered inactive and non-transferable by heat through an exposure to short wavelength radiation such as the naphthols disclosed in U.S. Pat. No. 3,094,417 to Workman, the pyrazolin-5-ones disclosed in U.S. Pat. No. 3,753,395, the reducing agents of the indanedione-1,3 type described in commonly assigned U.S. Patent Application Ser. No. 199,746, now U.S. Pat. No. 3,773,512 or an acetoacetonitrile derivative preferably within the scope of the following general formula:

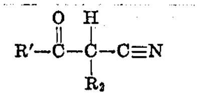

wherein:

- R′ is an alkyl group e.g., methyl including a substituted alkyl group, an alkoxy group, an aromatic group including a substituted aromatic group e.g., a chlorine -substituted phenyl group or a heterocyclic group including a substituted heterocyclic group, and
- $R_2$ is an aromatic or heterocyclic group including such groups in substituted state e.g., a phenyl group, or any other compound that reacts to form a coloured product with a reducible metal salt, preferably a silver salt of an aliphatic carboxylic acid containing at least 14 carbon atoms e.g., silver behenate or silver stearate. Suitable reactive silver salts are disclosed e.g., in U.S. Pat. No. 3,094,417. Other suitable colour-forming reaction partners than silver metal salts and that may be used in a receptor sheet to which unaffected photosensitive reductor is transferred by overall heating following the image-wise photo-exposure are described in the U.S. Pat. No. 3,753,395.

The photosensitive reductor of the copy sheet can be desensitized by exposure to ultraviolet radiation, but may be rendered sensitive to actinic radiation of longer wavelength, for instance that from a tungsten filament lamp, by introducing a dye sensitizer in accordance with well known photochemical technology. Dye sensitizers of the erythrosin family have been found to be quite suitable, but others may be used. The present derivatives of 1,4-dihydropyridine are preferably combined with a reducible silver salt in a suitable binder, e.g., polyvinyl butyral or poly-tert. butyl methacrylate, and applied to a supporting sheet of paper or the like to form a receptor sheet.

The derivative of 1,4-dihydropyridine is preferably used in an amount of at least 10 percent by weight with respect to the reducible silver salt.

The receptor sheet used in conjunction with the photosensitive copy sheet may contain, in addition to the colour-forming reactant and auxiliary reductor, a so-called toning agent, e.g., a 1-(2H)-phthalazinone as described e.g., in the German Patent Application P 22,206,18 206 corresponding to U.S. application Ser. No. 319,773, commonly assigned herewith, or phthalimide, which provides a more neutral image colour tone.

In order to obtain the desired visible image formation the receptor sheet and image-wise exposed copy sheet are heated within the temperature range of 50° to 200°C.

The following examples illustrate the present invention. The percentages are by weight unless otherwise indicated.

EXAMPLE 1

To a map overlay tracing paper the following composition was applied in a ratio of 25 g/sg.m:

| | | |
|---|---|---|
| 4-methoxy-1-naphthol | 1 | g |
| erythrosin | 440 | mg |
| ethylcellulose | 50 | g |
| methyl ethyl ketone up to | 500 | g |

After drying the photosensitive coating of the copy sheet was exposed in reflex to a graphic original having differentially light-absorptive image and background areas. The copy sheet was hereby placed with its coated surface in contact with the printed text of the opaque original. The exposure lasted 30 sec. and was effected by means of a tungsten filament light source of 1,500 Watt placed at a distance of 5 cm from the copy sheet.

Subsequently the irradiated sheet was pressed for 5 sec. with its photosensitive layer in contact at 125°C with a receptor sheet, which was a white paper prepared by coating and drying thereon a continuous thin colourless layer of a ball-milled mixture of silver behenate, phthalazinone as toning agent, 2,6-dimethyl-3,5-dicarbethoxy-1,4-dihydropyridine as auxiliary reductor, poly-tert.butyl methacrylate as binding agent (3 parts for every 10 parts of silver behenate) and 86 parts of acetone. The dried receptor sheet contained per sq.m an amount of silver behenate equivalent with 0.2 g of silver, 400 mg of phthalazinone, and 40 mg of 2,6-dimethyl-3,5-dicarbethoxy-1,4-dihydropyridine.

The resultant image on the receptor sheet had a markedly improved colour density as compared to a sheet that did not contain the derivative of 1,4-dihydropyridine as an auxiliary reducing agent.

Same good results were obtained with auxiliary reductors 2 and 3 of the list in the description. A same result was obtained by using in the copy sheet 2-(p-chlorophenyl)-acetoacetonitrile instead of 4-methoxy-1-naphthol as photosensitive reducing agent.

EXAMPLE 2

Good results were obtained also with a receptor sheet containing as in Example 1 per sq.m 40 mg of the derivative of 1,4-dihydropyridine and in the coating composition in parts by weight:

| | |
|---|---|
| ethyl acetate | 38.30 |
| polyvinyl butyral (Butvar B-79) | 3.00 |
| silver stearate | 1.51 |
| stearic acid | 0.2 |
| 2,6-dimethyl-3,5-dicarbethoxy-1,4-dihydropyridine | 0.6 |

The dried receptor sheet was heated in contact with a 3M Dual Spectrum Pink Sheet as described by Workman, U.S. Pat. No. 3,094,417, previously exposed as described therein. The resultant image obtained on the receptor sheet in accordance with this Example had a greatly improved colour density as compared to a sheet formed and exposed in the manner described and not containing the derivative of 1,4-dihydropyridine.

A process of recording information, in which the present organic reducing agent can be used likewise, is described in the U.K. Patent Specification 1,110,046. According to said Patent Specification a photosensitive and heat-developable recording material is applied, which contains:

1. a substantially non-light-sensitive silver salt of an organic acid,
2. a reducing agent, and
3. a catalytic amount of photolytically reducible silver halide, the silver halide being formed from the silver salt and being in catalytic proximity of the silver salt.

Said process comprises the exposure to a light image of said recording material and the heating of the exposed material to cause reduction of the silver salt and image formation at the light-exposed areas.

We claim:

1. A sheet material including in working relationship with a reducible silver salt a derivative of 1,4-dihydropyridine having the following general formula:

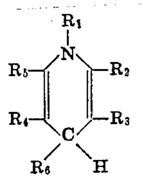

wherein:

$R_1$ represents hydrogen or a lower alkyl group,
each of $R_2$ and $R_5$ represents hydrogen or an alkyl group,
each of $R_3$ and $R_4$ represents cyano or a substituent containing a carbonyl group directly linked to the 1,4-dihydropyridine ring, and
$R_6$ represents hydrogen, an alkyl group or phenyl.

2. A sheet material according to claim 1, wherein each of $R_3$ and $R_4$ represents a carbonylalkoxy group.

3. A sheet material according to claim 1, wherein each of $R_3$ and $R_4$ represents an acetyl group.

4. A sheet material according to claim 1, wherein the silver salt is a silver salt of an aliphatic carboxylic acid containing at least 14 carbon atoms.

5. A sheet material according to claim 4, wherein the silver salt is silver behenate or silver stearate.

6. A sheet material according to claim 1, wherein said derivative is present in said material in an amount of at least 10 percent by weight with respect to the silver salt.

7. A sheet material according to claim 1, wherein said derivative and said reducible silver salt are used in admixture with a binder applied in layer form to a paper support.

8. A sheet material according to claim 7, wherein said derivative and silver salt are used in conjunction with a toning agent.

9. A method for recording and reproducing information comprising the steps of information-wise exposing to activating electromagnetic radiation a photosensitive recording element comprising a photodeactivable reductor capable of reducing a silver soap at elevated temperature, and uniformly heating said exposed material while being in intimate contact with a sheet material including in working relationship with a reducible silver salt a derivative of 1,4-dihydropyridine having the following general formula:

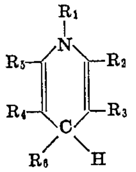

wherein:

$R_1$ represents hydrogen or a lower alkyl group,
each of $R_2$ and $R_5$ represents hydrogen or an alkyl group,
each of $R_3$ and $R_4$ represents cyano or a substituent containing a carbonyl group directly linked to the 1,4-dihydropyridine ring, and
$R_6$ represents hydrogen, an alkyl group or phenyl, thereby transferring unactivated reductor to said sheet material and forming with the aid of said derivative a visible image thereon.

10. A recording process according to claim 9, wherein each of $R_3$ and $R_4$ represents a carbonylalkoxy group.

11. A recording process according to claim 9, wherein each of $R_3$ and $R_4$ represents an acetyl group.

12. A recording process according to claim 9, wherein the silver salt is a silver salt of an aliphatic carboxylic acid containing at least 14 carbon atoms.

13. A recording process according to claim 12, wherein the silver salt is silver behenate or silver stearate.

14. A recording process according to claim 9, wherein said derivative is used in an amount of at least 10 percent by weight with respect to the silver salt.

15. A recording process according to claim 9, wherein the sheet material is heated in a temperature range of 50° to 200°C.

* * * * *